United States Patent
Tanaka (10) Patent No.: US 9,674,437 B2
(45) Date of Patent: Jun. 6, 2017

(54) IMAGING APPARATUS, IMAGING METHOD AND COMPUTER READABLE RECORDING MEDIUM HAVING PROGRAM FOR PERFORMING INTERVAL SHOOTING

(71) Applicant: CASIO COMPUTER CO., LTD., Shibuya-ku, Tokyo (JP)

(72) Inventor: Hitoshi Tanaka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 46 days.

(21) Appl. No.: 14/610,817

(22) Filed: Jan. 30, 2015

(65) Prior Publication Data
US 2015/0271407 A1 Sep. 24, 2015

(30) Foreign Application Priority Data
Mar. 19, 2014 (JP) .................... 2014-056516

(51) Int. Cl.
H04N 5/232 (2006.01)
H04N 5/235 (2006.01)
H04N 5/355 (2011.01)

(52) U.S. Cl.
CPC ....... *H04N 5/23245* (2013.01); *H04N 5/2355* (2013.01); *H04N 5/35572* (2013.01)

(58) Field of Classification Search
CPC ............. H04N 5/23245; H04N 5/2355; H04N 5/35572; H04N 5/23229; H04N 5/23254;
(Continued)

(56) References Cited

U.S. PATENT DOCUMENTS 5,132,801 A * 7/1992 Yamano ............... H04N 5/3651
348/245
7,432,959 B2 10/2008 Ueda
(Continued)

FOREIGN PATENT DOCUMENTS

JP 2003244614 A 8/2003
JP 2004134845 A 4/2004
(Continued)

OTHER PUBLICATIONS

Japanese Office Action (and English translation thereof) dated Jun. 23, 2015, issued in counterpart Japanese Application No. 2014-056516.
(Continued)

*Primary Examiner* — Hung Lam
(74) *Attorney, Agent, or Firm* — Holtz, Holtz & Volek PC (57) ABSTRACT

The present invention provides an imaging apparatus configured to perform interval shooting for taking shots sequentially at a set shooting interval. The imaging apparatus includes a shooting parameter setting unit and the shooting parameter setting limiting unit. The shooting parameter setting unit sets time-related shooting parameters including a shooting interval of the interval shooting. Further, the shooting parameter setting unit determines the shooting situation or shooting setting. The shooting parameter setting limiting unit limits a settable range of a time-related shooting parameter to be set by the shooting parameter setting unit to a different range according to the shooting situation or the shooting setting determined by the shooting parameter setting unit.

20 Claims, 6 Drawing Sheets (58) Field of Classification Search
CPC ...... H04N 5/23293; H04N 19/00; G06K 9/22; G06K 9/32
See application file for complete search history.

(56) References Cited

U.S. PATENT DOCUMENTS

| | | | |
|---|---|---|---|
| 7,554,585 B2 | 6/2009 | Masuyama | |
| 7,574,129 B2 | 8/2009 | Tsukuda | |
| 8,441,561 B2 | 5/2013 | Okado | |
| 8,879,869 B2 * | 11/2014 | Zamfir | H04N 5/217 382/173 |
| 9,197,811 B2 * | 11/2015 | Sakamoto | H04N 5/23229 |
| 2011/0242360 A1 * | 10/2011 | Mori | H04N 5/772 348/231.1 |

FOREIGN PATENT DOCUMENTS

| | | |
|---|---|---|
| JP | 2004233664 A | 8/2004 |
| JP | 2005159447 A | 6/2005 |
| JP | 2006093867 A | 4/2006 |
| JP | 2007043463 A | 2/2007 |
| JP | 2010118963 A | 5/2010 |
| JP | 2011029887 A | 2/2011 |

OTHER PUBLICATIONS

Japanese Office Action (and partial English translation thereof) dated Nov. 15, 2016 issued in counterpart Japanese Application No. 2014-056516.

Japanese Office Action (and English translation thereof) drafted May 18, 2016 issued in counterpart Japanese Application No. 2014-056516.

* cited by examiner

SETTABLE RANGE FOR EACH SCENE

| SCENE | SETTABLE SHOOTING INTERVAL | | | | | | | | SETTABLE NO. OF SHOTS | | | | | | POST-SHOOT PROCESSING |
|---|---|---|---|---|---|---|---|---|---|---|---|---|---|---|---|
| NORMAL | 10SEC | 20SEC | 30SEC | 1MIN | 2MIN | 3MIN | 5MIN | 10MIN | 20MIN | 30MIN | 60MIN | 10 | 20 | 30 | 50 | 100 | 200 | 300 | 500 | JUST COMMON |
| FLOWER | 10SEC | 20SEC | 30SEC | 1MIN | 2MIN | 3MIN | 5MIN | 10MIN | 20MIN | 30MIN | 60MIN | 10 | 20 | 30 | 50 | 100 | 200 | 300 | 500 | JUST COMMON |
| HDR | | 20SEC | 30SEC | 1MIN | 2MIN | 3MIN | 5MIN | 10MIN | 20MIN | 30MIN | 60MIN | 10 | 20 | 30 | 50 | 100 | 200 | 300 | 500 | COMMON+IMAGE COMPOSITION |
| STARLIT SKY | | | 30SEC | 1MIN | 2MIN | 3MIN | 5MIN | 10MIN | 20MIN | 30MIN | 60MIN | 10 | 20 | 30 | 50 | 100 | 200 | 300 | 500 | COMMON+DARK SUBTRACTION |
| MOVEMENT OF MOON | | | | 1MIN | 2MIN | 3MIN | 5MIN | 10MIN | 20MIN | 30MIN | 60MIN | 10 | 20 | 30 | 50 | 100 | 200 | 300 | 500 | COMMON+DARK SUBTRACTION |

▓ ARE INITIAL VALUES

FIG. 3B

SETTABLE RANGE OF SHOOTING INTERVAL
FOR SHUTTER SPEED OF "STARLIT SKY"

| SHUTTER SPEED | TOTAL SHOOTING TIME | SETTABLE SHOOTING INTERVAL |
| --- | --- | --- |
| LESS THAN 13SEC | ABOUT 26SEC | ALL SHOOTING INTERVALS |
| 15SEC | ABOUT 30SEC | 1MIN OR LONGER |
| 20SEC | ABOUT 40SEC | 1MIN OR LONGER |
| 25SEC | ABOUT 50SEC | 1MIN OR LONGER |
| 30SEC | ABOUT 60SEC | 2MIN OR LONGER |

FIG. 3C

SETTABLE RANGE OF SHUTTER SPEED
FOR SHOOTING INTERVAL OF "STARLIT SKY"

| SHOOTING INTERVAL | SETTABLE SHUTTER SPEED |
|---|---|
| 30SEC | 13SEC OR SHORTER |
| 1MIN | 25SEC OR SHORTER |
| 2MIN OR LONGER | ALL SHUTTER SPEED |

FIG. 4

IMAGING APPARATUS, IMAGING METHOD AND COMPUTER READABLE RECORDING MEDIUM HAVING PROGRAM FOR PERFORMING INTERVAL SHOOTING

CROSS-REFERENCE TO RELATED APPLICATIONS

This application is based upon and claims the benefit of priority under 35 USC 119 of Japanese Patent Application No. 2014-056516 filed on Mar. 19, 2014, the entire disclosure of which is incorporated herein by reference in its entirety for all purposes.

BACKGROUND OF THE INVENTION

1. Field of the Invention

The present invention relates to an imaging apparatus, an imaging method and a computer readable recording medium for recording a program thereon.

2. Description of the Related Art

Conventionally, there has been known interval shooting by which multiple shots are taken successively at a predetermined time interval. For example, Japanese Patent Application Laid-Open Publication No. 2006-93867 published on Apr. 6, 2006, discloses a technology for enabling a user to arbitrarily change values of shooting parameters including a shooting interval set as initial values.

SUMMARY OF THE INVENTION

According to the first aspect of the present invention, an imaging apparatus for interval shooting of taking shots sequentially at a set shooting interval is provided. The imaging apparatus includes a shooting parameter setting section configured to set a time-related shooting parameter of the interval shooting including the shooting interval, a determining section configured to determine a shooting situation automatically or manually, and a range setting section configured to limit a settable range of the time-related shooting parameter to be set by the shooting parameter setting section to a different range according to the shooting situation determined by the determining section.

According to the second aspect of the present invention, an imaging apparatus for interval shooting of taking shots sequentially at a set shooting interval is provided. The imaging apparatus includes a shooting parameter setting section configured to set a plurality of time-related shooting parameters of the interval shooting including the shooting interval, a determining section configured to determine a shooting situation automatically or manually, and a range setting section configured to, according to the shooting situation determined by the determining section and setting of one time-related shooting parameter, limit settable ranges of one or more other time-related shooting parameters.

According to the third aspect of the present invention, an imaging method executed by an imaging apparatus for performing interval shooting of taking shots sequentially at a set shooting interval is provided. The imaging method includes a determining step of determining a shooting situation automatically or manually, a shooting parameter setting step of setting a time-related shooting parameter of the interval shooting including the shooting interval, and a range setting step of limiting a settable range of the time-related shooting parameter to be set at the shooting parameter setting step to a different range according to the shooting situation determined at the determining step.

According to the forth aspect of the present invention, an imaging method executed by an imaging apparatus for performing interval shooting of taking shots sequentially at a set shooting interval is provided. The imaging method includes a determining step of determining a shooting situation automatically or manually, a shooting parameter setting step of setting a time-related shooting parameter of the interval shooting including the shooting interval, and a range setting step of, according to the shooting situation determined at the determining step and setting of one time-related shooting parameter, limiting settable ranges of one or more other time-related shooting parameters.

According to the fifth aspect of the present invention, an imaging method executed by an imaging apparatus for performing interval shooting of taking shots sequentially at a set shooting interval is provided. The imaging method includes a determining step of determining a shooting situation automatically or manually, and a range setting step of limiting a settable range of shutter speed according to the shooting situation determined at the determining step and setting of the shooting interval.

According to the sixth aspect of the present invention, an imaging method executed by an imaging apparatus for performing interval shooting of taking shots sequentially at a set shooting interval is provided. The imaging method includes a determining step of determining a shooting situation automatically or manually, and a range setting step of limiting a settable range of the shooting interval according to the shooting situation determined at the determining step and setting of shutter speed.

According to the seventh aspect of the present invention, a non-transitory computer-readable recording medium for recording a program readable by a computer controlling an imaging apparatus for performing interval shooting of taking shots sequentially at a set shooting interval is provided. The program controls the computer to perform functions including a determining function for determining a shooting situation automatically or manually, a shooting parameter setting function for setting a time-related shooting parameter of the interval shooting including the shooting interval, and a range setting function for limiting a settable range of the time-related shooting parameter to be set by the shooting parameter setting function to a different range according to the shooting situation determined by the determining function.

According to the eighth aspect of the present invention, a non-transitory computer-readable recording medium for recording a program readable by a computer controlling an imaging apparatus for performing interval shooting of taking shots sequentially at a set shooting interval is provided. The program controls the computer to perform functions including a determining function for determining a shooting situation automatically or manually, a shooting parameter setting function for setting a time-related shooting parameter of the interval shooting including the shooting interval, and a range setting function for, according to the shooting situation determined by the determining function and setting of one time-related shooting parameter, limiting settable ranges of one or more other time-related shooting parameters.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are, however, exclusively for explanation and do not limit the scope of the present invention.

Here.

DETAILED DESCRIPTION OF THE PREFERRED EMBODIMENT

Hereinafter, embodiments of the present invention will be described with reference to the accompanying drawings.

Figure 1:
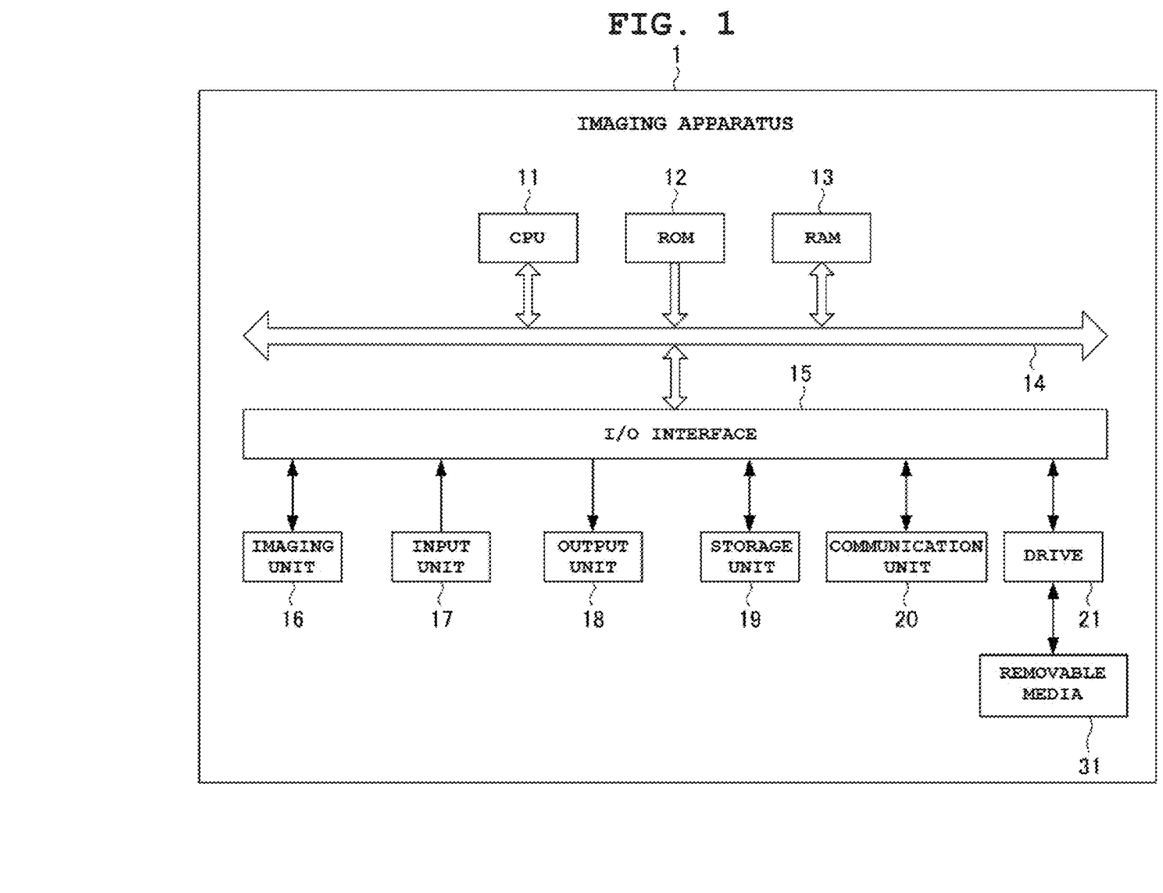
FIG. 1 is a block diagram showing a hardware configuration of an imaging apparatus according to an embodiment of the present invention.

FIG. 1 is a block diagram showing a hardware configuration of an imaging apparatus according to an embodiment of the present invention.

For example, the imaging apparatus 1 is realized by a digital camera.

The imaging apparatus 1 includes a CPU (Central Processing Unit) 11, a ROM (Read Only Memory) 12, a RAM (Random Access Memory) 13, a bus 14, an I/O interface 15, an imaging unit 16, an input unit 17, an output unit 18, a storage unit 19, a communication unit 20, and a drive 21.

The CPU 11 executes various processes in accordance with programs stored in the ROM 12 or loaded in the RAM 13 from the storage unit 19.

In the RAM 13, there are stored data necessary for the CPU 11 to execute various processes, and the like.

The CPU 11, the ROM 12 and the RAM 13 are connected to each other via the bus 14. The I/O interface 15 is also connected to the bus 14. The imaging unit 16, the input unit 17, the output unit 18, the storage unit 19, the communication unit 20, and the drive 21 are connected to the I/O interface 15.

The imaging unit 16 includes an optical lens unit and an image sensor (not shown in the drawing).

The optical lens unit includes lenses for collecting light to photograph a subject, for example, a focus lens, a zoom lens, and the like.

The focus lens forms an image of a subject on a light-receiving surface of the image sensor. The zoom lens freely changes the focal length within a predetermined range.

Further, the optical lens unit is provided with a peripheral circuit to adjust setting parameters such as focusing, exposure, white balancing, and the like, as necessary.

The image sensor includes a photoelectric conversion element, an AFE (Analog Front End), and the like.

The photoelectric conversion element includes a CMOS (Complementary Metal Oxide Semiconductor) type photoelectric conversion element, for example. A subject's image is input to the photoelectric conversion element from the optical lens unit. The photoelectric conversion element performs photoelectric conversion (image capturing) of the subject's image and accumulates image signals for a predetermined period of time. The photoelectric conversion element provides the AFE with the accumulated image signals sequentially.

The AFE performs various signal processing operations such as A/D (Analog/Digital) conversion on the analog image signals. Digital signals are generated by the signal processing operations and output as output signals of the imaging unit 16.

The output signals of the imaging unit 16 are hereinafter referred to as "data of a captured image". The data of the captured image is supplied to the CPU 11, an image processing unit (not shown in the drawing), or the like.

The input unit 17 includes various buttons and a variety of information is input via the input unit 17 in response to a user's operations.

The output unit 18 includes a display device, a speaker, or the like, and outputs images or voices.

The storage unit 19 includes a hard disk, a DRAM (Dynamic Random Access Memory), or the like and various image data is stored in the storage unit 19.

The communication unit 20 controls communication with different devices (not shown in the drawing) via a network such as Internet.

A removable media 31 including a magnetic disk, an optical disk, a magneto-optical disc, a semiconductor memory, or the like, is mounted on the drive 21. A program read out from the removable media 31 by the drive 21 is installed in the storage unit 19 as necessary. Similarly to the storage unit 19, the removable media 31 stores various data such as the image data stored in the storage unit 19.

The imaging apparatus 1 configured as described above has a function of performing interval shooting to take shots at a shooting interval and acquire a plurality of images taken at a predetermined shooting interval (hereinafter, referred to as "interval shooting images").

Conventionally, for example, in the case that a shooting interval is too short, the next shooting interval comes before post-shoot processing of the previous shooting is ended. Thus, there have been problems that shooting is not performed and interval shooting cannot be guaranteed. The imaging apparatus 1 of the present embodiment can perform interval shooting reliably by allowing a shooting interval to be set in consideration of time taken for various operations such as post-shoot processing time or time of shutter speed.

Figure 2:
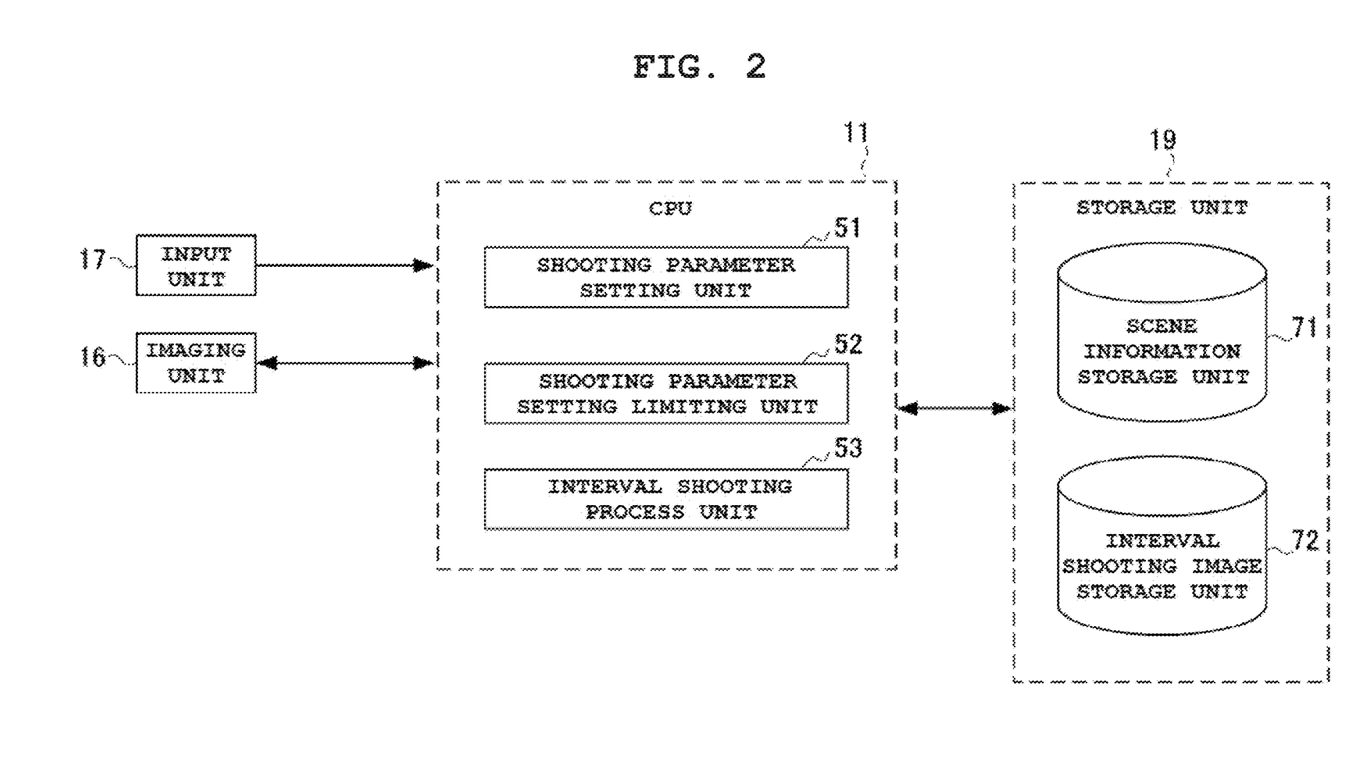
FIG. 2 is a functional block diagram showing a functional configuration of the imaging apparatus of FIG. 1 for performing an interval shooting process.

FIG. 2 is a functional block diagram showing a functional configuration of the imaging apparatus of FIG. 1 for performing an interval shooting process.

The interval shooting process according to the present embodiment means a series of operations for performing interval shooting under setting according to a scene to be shot and management relating to low-power operations between shoots according to the setting.

As shown in FIG. 2, a shooting parameter setting unit 51, a shooting parameter setting limiting unit 52, and the interval shooting process unit 53 of the CPU 11 function to execute the interval shooting process.

In an area of the storage unit 19, a scene information storage unit 71 and an interval shooting image storage unit 72 are configured.

Information on shooting parameters corresponding to a scene to be shot (hereinafter, referred to as "scene information") is stored in the scene information storage unit 71.

The scene information includes a table in which scenes to be shot correspond to values of shooting parameters (hereinafter, referred to as a "scene table").

Figure 3A:
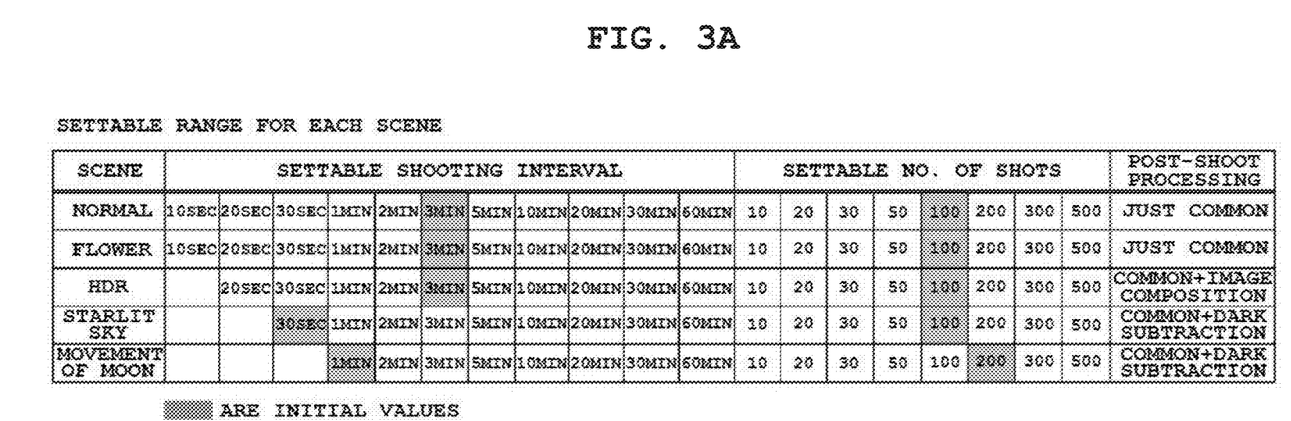
FIGS. 3A, 3B and 3C are drawings for explanation of various shooting parameters which are set according to scenes to be shot.
Figure 3B:
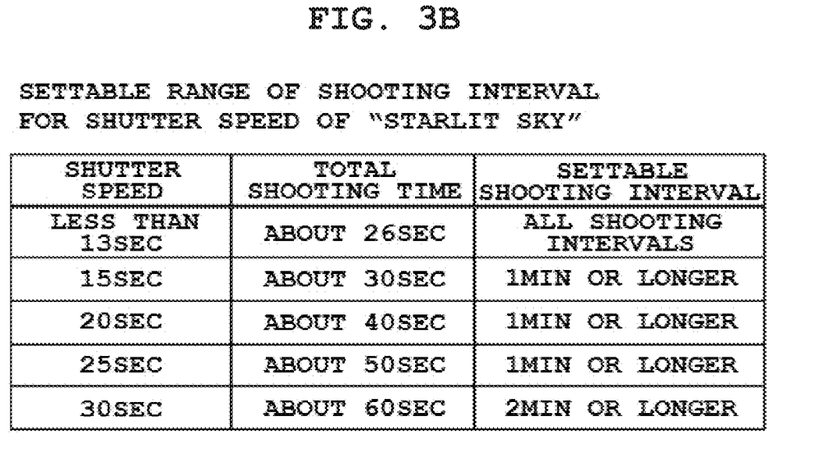
Figure 3C:
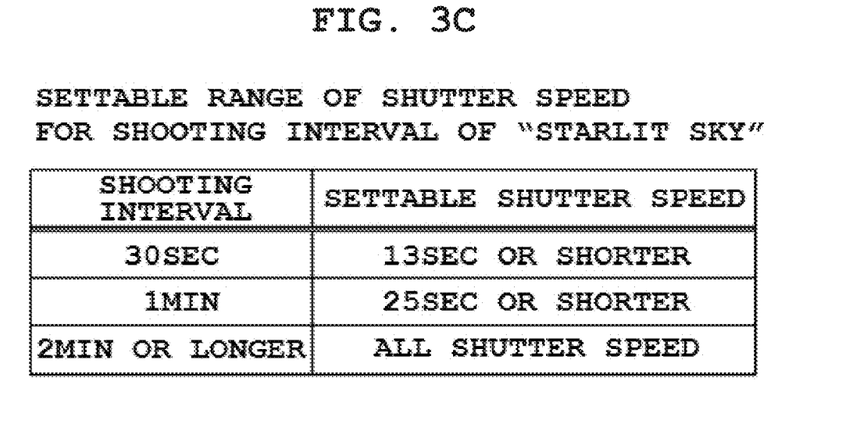

Now, the scene table is explained. FIGS. 3A, 3B and 3C are drawings for explanation of various shooting parameters which are set according to scenes to be shot.

As shown in FIG. 3A, "SCENE" corresponds to "SHOOTING PARAMETER" in the scene table.

In the present embodiment, the "SCENE" includes "NORMAL", "FLOWER", "HDR", "STARLIT SKY", and "MOVEMENT OF MOON".

The "NORMAL" is a scene for taking a normal shot, the "FLOWER" for taking a shot of flowers, the "HDR" for acquiring an image expressing a dynamic range wider than that of normal photography, the "STARLIT SKY" for taking a shot of a starlit sky, and the "MOVEMENT OF MOON" for taking a shot of the moon, especially, movement of the moon.

In the present embodiment, the "SHOOTING PARAMETER" includes "SETTABLE SHOOTING INTERVAL", "SETTABLE NO. OF SHOTS" and "POST-SHOOT PROCESSING".

The "SETTABLE SHOOTING INTERVAL" is a shooting time interval of interval shooting which can be set for a scene to be shot, the "SETTABLE NO. OF SHOTS" is the number of shots which can be set for a scene to be shot, and the "POST-SHOOT PROCESSING" is processing executed after shooting for a scene to be shot.

The "POST-SHOOT PROCESSING" is just common processing ("JUST COMMON") for the "NORMAL" and the "FLOWER", the common processing and image composition processing relating to HDR ("COMMON+IMAGE COMPOSITION") for the "HDR", and the common processing and processing for dark subtraction ("COMMON+DARK SUBTRACTION") for the "STARLIT SKY" and the "MOVEMENT OF MOON" because a shot is taken in a situation where brightness is low.

The common processing as used herein means image storage which is a standard process executed for any shoot. The image composition processing relating to HDR as used herein means processing for composing a plurality of images taken at different exposure levels and is hereinafter referred to as "HDR processing". The processing for dark subtraction as used herein means subtraction of dark noise from an image (noise subtraction) and is hereinafter referred to as "dark subtraction processing".

The "SETTABLE SHOOTING INTERVAL" is from 20 seconds for the "HDR", from 30 seconds for the "STARLIT SKY", and from one minute for the "MOVEMENT OF MOON" because these scenes require the "POST-SHOOT PROCESSING" including other processing as well as the common processing. The "SETTABLE SHOOTING INTERVAL" is determined using inverse operation of time taken to execute the post-shoot processing (hereinafter, referred to as "post-shoot processing time") in order to prevent the interval shooting from being failed.

Further, according to the present embodiment, shutter speed is also settable and a settable range of the shooting interval changes according to the set shutter speed. In other words, a settable range of the shooting interval for each scene to be shot is limited according to the set shutter speed.

As shown in FIG. 3B, "SHUTTER SPEED: LESS THAN 13 SEC" corresponds to "TOTAL SHOOTING TIME: ABOUT 26 SEC" including the post-shoot processing time for an example of "SCENE: STARLIT SKY" and, in this case, the shooting interval can be set to any interval within all the settable shooting intervals shown in FIG. 3A. On the other hand, "SHUTTER SPEED: 15~30 SEC" corresponds to "TOTAL SHOOTING TIME: ABOUT 30 SEC~ABOUT 60 SEC" and, in this case, the shooting interval can be set to one minute or longer. In other words, in the case of "SHUTTER SPEED: 15~30 SEC", the shooting interval cannot be set to 30 seconds in consideration of the post-shoot processing.

Conversely, a settable range of the shutter speed is limited from the shooting interval for each scene to be shot. If the shooting interval is set, settable shutter speed is determined in consideration of the post-shoot processing.

FIG. 3C shows an example of a settable range of the shutter speed corresponding to shooting intervals for the case of "SCENE: STARLIT SKY". As shown in FIG. 3C, "SETTABLE SHUTTER SPEED" is 13 seconds or shorter for "SHOOTING INTERVAL: 30 SEC", 25 seconds or shorter for "SHOOTING INTERVAL: 1 MIN", and 30 seconds or shorter for "SHOOTING INTERVAL: 2 MIN".

Although only the example of "SCENE: STARLIT SKY" was described above, the parameters can also be properly set based on settable ranges of each scene to be shot for the "HDR" and "MOVEMENT OF MOON" which include other processing as well as the common processing.

Further, in the present embodiment, as the shutter speed is set according to AE (Automatic Exposure), it is set in consideration of the above constraints. Thus, the present embodiment does not set parameters to meaningless values and can prevent the interval shooting from being failed.

Returning to FIG. 2, data of a plurality of captured images acquired by the interval shooting is stored in the interval shooting image storage unit 72.

The shooting parameter setting unit 51 sets values of shooting parameters according to scenes to be shot. In the present embodiment, the shooting parameter setting unit 51 sets the shooting interval (in seconds according to the present embodiment) and/or the number of shots of the interval shooting as the shooting parameters.

Further, the shooting parameter setting unit 51 allows a user to be able to set values of the shooting parameters.

The shooting parameter setting limiting unit 52 limits a settable range of a selectable shooting parameter according to scenes to be shot. More specifically, the shooting parameter setting limiting unit 52 limits a settable range of a shooting parameter relating to shooting time to a range determined in consideration of time required to execute processing which is necessary for each scene to be shot. Thus, the user can set a value of a shooting parameter within a permissible range limited according to a scene to be shot compared to a range which could be settable if the shooting parameter was not corresponded to a specific scene.

The interval shooting process unit 53 executes processes such as control of the imaging unit 16 relating to the interval shooting.

More specifically, the interval shooting process unit 53 performs management of the number of shots and control of the imaging unit 16 to acquire interval shooting images of a set number.

Further, the interval shooting process unit 53 executes post-shoot processing. The post-shoot processing is performed for the interval shooting images output from the imaging unit 16 and includes image storage as standard processing executed for any shoot and processing specific to a scene to be shot.

The processing specific to a scene to be shot means processing executed according to a scene to be shot and includes, for example, dark subtraction and HDR processing. As it is executed after shooting and requires certain time, parameters relating to time need to be set in consideration of processing which should be executed before the next shoot. As the imaging apparatus 1 of the present embodiment limits a settable range of the shooting interval of the interval shooting in consideration of processing which is executed for a scene to be shot, it is possible to perform the interval shooting of any scene without fail.

The interval shooting process unit 53 controls the interval shooting image storage unit 72 to store interval shooting images for which the post-shoot processing has been performed.

Figure 4:
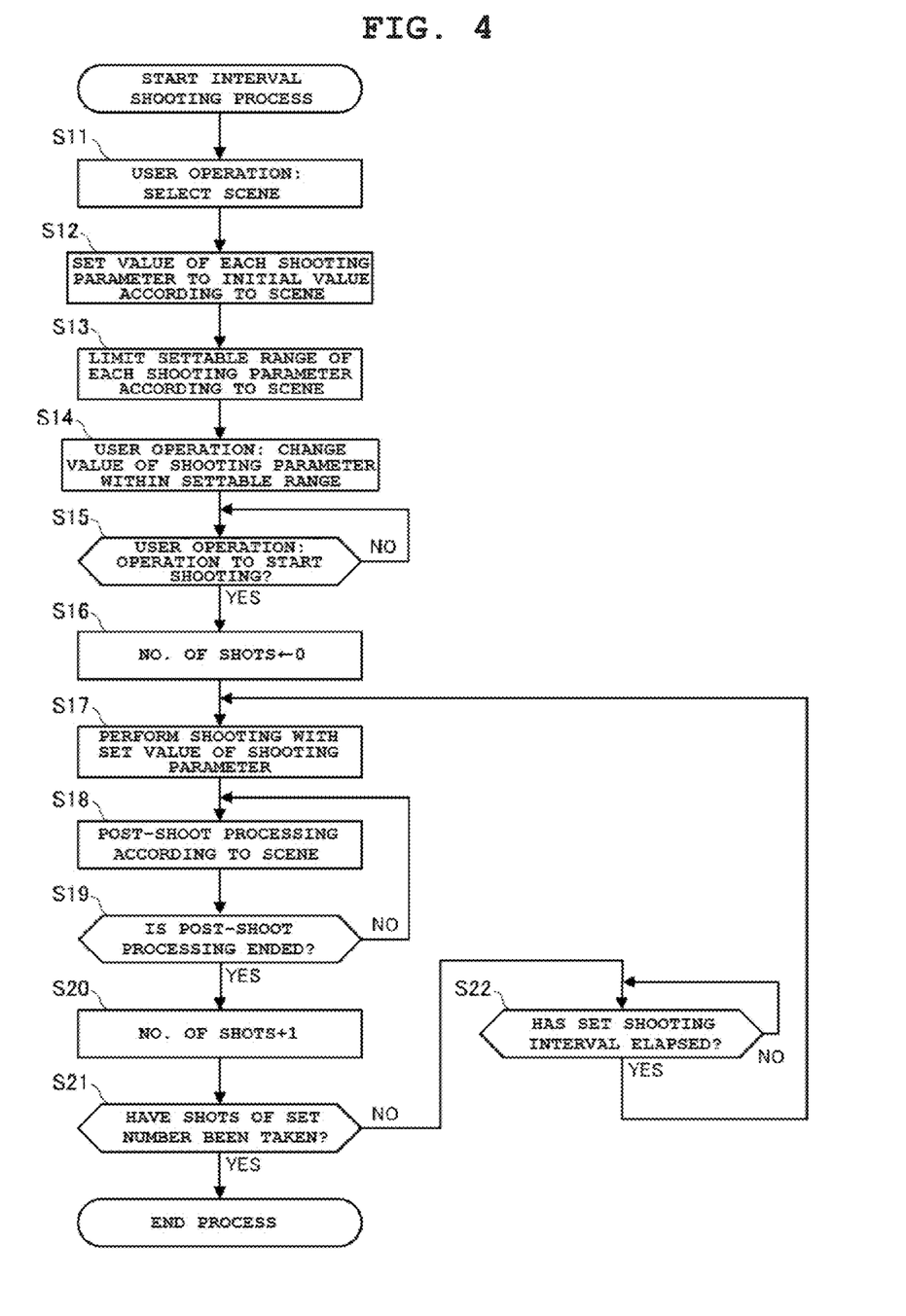
FIG. 4 is a flow chart for explaining the interval shooting process performed by the imaging apparatus of FIG. 1 including the functional configuration shown in FIG. 2.

FIG. 4 is a flow chart for explaining the interval shooting process performed by the imaging apparatus 1 of FIG. 1 including the functional configuration shown in FIG. 2.

The interval shooting process is started by an operation to start the process input by the user to the input unit 17.

At Step S11, the shooting parameter setting unit 51 receives the user's selection of a scene to be shot through the input unit 17.

At Step S12, the shooting parameter setting unit 51 sets shooting parameters to initial values according to the scene selected by the user by referring to the scene table stored in the scene information storage unit 71. More specifically, the shooting parameter setting unit 51 sets the shooting parameters to initial values in the scene table of FIG. 3A, which are colored in gray.

At Step S13, the shooting parameter setting limiting unit 52 limits a settable range of each shooting parameter according to the scene. More specifically, the shooting parameter setting limiting unit 52 shows the user a settable shooting interval according to the selected scene as shown in the scene table of FIG. 3A so that the user can select a shooting interval within a limited range.

At Step S14, the shooting parameter setting unit 51 receives through the input unit 17 the user's request to change a shooting parameter of the scene to be shot within the settable range.

At Step S15, the interval shooting process unit 53 determines whether or not an operation to start shooting is input through the input unit 17 by the user.

In the case that no operation to start shooting is input, the determination at Step S15 is "NO" and the process stands by until an operation to start shooting is input.

In the case that an operation to start shooting is input, the determination at Step S15 is "YES" and the process proceeds to Step S16.

At Step S16, the interval shooting process unit 53 sets the number of shots to zero (0) in preparation for forthcoming interval shooting.

At Step S17, the interval shooting process unit 53 performs shooting with the values of the shooting parameters set within the settable ranges. In other words, the interval shooting process unit 53 controls the imaging unit 16 based on the setting of the scene set within the settable ranges.

At Step S18, the interval shooting process unit 53 executes post-shoot processing according to the scene. For example, the interval shooting process unit 53 performs the dark subtraction processing for an image taken by the interval shooting output from the imaging unit 16 in the case of "SCENE: STARLIT SKY" or "SCENE: MOVEMENT OF MOON" and the HDR processing in the case of "SCENE: HDR".

Then, the interval shooting process unit 53 allows the image taken by the interval shooting for which the post-shoot processing has been performed to be stored in the interval shooting image storage unit 72.

At Step S19, the interval shooting process unit 53 determines whether or not the post-shoot processing is ended.

In the case that the post-shoot processing is not ended, the determination at Step S19 is "NO" and the process returns to Step S18.

In the case that the post-shoot processing is ended, the determination at Step S19 is "YES" and the process proceeds to Step S20.

At Step S20, the interval shooting process unit 53 increases the number of shots by one.

At Step S21, the interval shooting process unit 53 determines whether or not shots of a set number have been taken.

In the case that shots of the set number have been taken, the determination at Step is "YES" and the interval shooting process is ended.

In the case that shots of the set number have not been taken yet, the determination at Step is "NO" and the process proceeds to Step S22.

At Step S22, the interval shooting process unit 53 determines whether or not the set shooting interval has elapsed.

In the case that the set shooting interval has elapsed, the determination at Step S22 is "YES" and the process returns to Step S17.

In the case that the set shooting interval has not elapsed, the determination at Step S22 is "NO" and the process stands by until the set shooting interval elapses.

Thus, it is possible to perform interval shooting with shooting parameters relating to time (hereinafter, referred as to "time-related shooting parameters") set freely and properly.

The imaging apparatus 1 configured as above performs interval shooting for taking shots sequentially at a set shooting interval and includes the shooting parameter setting unit 51 and the shooting parameter setting limiting unit 52.

The shooting parameter setting unit 51 sets time-related shooting parameters including the shooting interval of the interval shooting.

Further, the shooting parameter setting unit 51 determines a shooting situation or shooting setting.

The shooting parameter setting limiting unit 52 limits a settable range of a time-related shooting parameter to be set by the shooting parameter setting unit 51 to a different range according to the determined shooting situation or shooting setting.

Thus, as the imaging apparatus 1 of the present embodiment limits a settable range of a time-related shooting parameter to be set by the shooting parameter setting unit 51 to different ranges according to shooting situations or shooting setting, it is possible to perform interval shooting without fail by setting freely and properly the time-related shooting parameter such as a shooting interval or shutter speed, for example.

In some embodiments, the shooting parameter setting limiting unit 52 limits a settable range of a time-related shooting parameter to a range determined in consideration of time required to execute processing necessary for the determined shooting situation or shooting setting.

Thus, the imaging apparatus 1 can perform interval shooting without fail by considering time required to execute necessary processing.

The shooting parameter setting limiting unit 52 specifies necessary processing for the determined shooting situation or shooting setting.

Further, the shooting parameter setting limiting unit 52 limits a settable range of a time-related shooting parameter to a range determined in consideration of time required to execute the specified necessary processing.

Thus, as the imaging apparatus 1 specifies necessary processing according to shooting situations or shooting setting, it is possible to set automatically a time-related shooting parameter.

According to certain embodiments, the shooting parameter setting limiting unit 52 limits the settable range manually by the user's operation.

Thus, the imaging apparatus 1 of the present embodiment allows the user to set shooting parameters and can enhance the degree of freedom in setting the shooting parameters.

The imaging apparatus 1 is configured to be able to set a plurality of shooting parameters relating to time.

According to setting of one time-related shooting parameter, the shooting parameter setting limiting unit 52 limits settable ranges of one or more other time-related shooting parameters.

Thus, according to the imaging apparatus 1 of the present embodiment, it is possible to perform interval shooting without fail by limiting temporally influenced shooting parameters in consideration of one another.

In one embodiment, the one time-related shooting parameter is the shooting interval.

Thus, according to the imaging apparatus 1 of the present embodiment, it is possible to perform interval shooting without fail by limiting temporally influenced shooting parameters in consideration of one another.

The one or more other time-related shooting parameters include the shutter speed.

Thus, according to the imaging apparatus 1 of the present embodiment, it is possible to perform interval shooting without fail by limiting temporally influenced shooting parameters in consideration of one another.

In one embodiment, the one time-related shooting parameter is the shutter speed.

Thus, according to the imaging apparatus 1 of the present embodiment, it is possible to perform interval shooting without fail by limiting temporally influenced shooting parameters in consideration of one another.

The one or more other time-related shooting parameters include the shooting interval.

Thus, according to the imaging apparatus 1 of the present embodiment, it is possible to perform interval shooting without fail by limiting temporally influenced shooting parameters in consideration of one another.

The shooting parameter setting limiting unit 52 limits the settable range to a range determined in consideration of time required to execute the dark subtraction processing which is necessary in the case of determining that brightness of a captured image is low.

Thus, according to the imaging apparatus 1 of the present embodiment, it is possible to perform interval shooting without fail because the settable range is limited to a range determined in consideration of time required to execute the dark subtraction processing in the situation where brightness of a captured image is low.

The shooting setting depends on a shooting mode for performing predetermined image processing for a captured image which is selected by the user.

The shooting parameter setting limiting unit 52 limits the settable range to a range determined in consideration of time required to execute image processing which is necessary for the selected shooting mode.

Thus, as the imaging apparatus 1 of the present embodiment can take into account necessary processing by the shooting mode in the case of executing predetermined image processing such as the HDR processing, it is possible to perform interval shooting without fail by limiting the settable range to a range determined in consideration of time required for necessary processing.

Further, the present invention is not limited to the embodiments described above and any modifications or alternatives which can achieve the objects of the invention fall within the scope of the invention.

The above embodiment is configured to allow the user to select a scene. But, some embodiments may be configured to analyze a captured image by using a well-known image analysis technology and set a scene automatically.

In addition, some embodiments may be configured to have no table describing settable ranges according to scenes to be shot in advance. Instead, they may specify necessary processing according to the automatically set scene and limit settable ranges by calculation in consideration of the specified processing.

Some embodiments may be configured to set an initial value at the time of starting shooting to a value which the user selects within a settable range, a value used in the previous shooting for each scene, or a value set automatically within a settable range which is limited according to the determined shooting situation or shooting setting without relying on the table.

More specifically, the shooting parameter setting unit 51 may be configured to set an initial value of a time-related shooting parameter to different values within a settable range limited according to the determined shooting situation or shooting setting.

Further, according to the above embodiments, the unit of a settable value of a time-related shooting parameter may be second (sec) more minutely if the settable value falls within a range in which it meets conditions required for the time-related shooting parameter.

The above embodiments are configured to limit parameters such as the shooting interval of the interval shooting in consideration of post-processing such as the common processing, the HDR processing, and the dark subtraction processing, or processing at the time of shooting such as the shutter speed. As the interval shooting takes multiple shots sequentially, shooting parameters are affected by processing required before taking a shot. Therefore, some embodiments may be configured to limit ranges of the shooting parameters such as the shooting time interval of the interval shooting taking into account time taken to execute pre-shoot processing such as preparation for strobe, switch to a low-power state and switch from the low-power state to a normal state, for example.

Further, in the embodiments described above, the present invention has been applied to a digital camera as an example of the imaging apparatus 1 without limitation.

For example, the present invention can be applied to general electronic devices having interval shooting function. Specifically, the present invention can be applied to a notebook type personal computer, a printer, a television, a video camera, a portable navigation device, a mobile phone, a smart phone, a portable game device, and the like.

The process sequence described above can be executed by hardware or software.

In other words, the functional configuration shown in FIG. 2 is merely an example and the present invention is not limited thereto. The imaging apparatus 1 suffices if it has a function for performing the process sequence as a whole. Functional blocks to use to implement this function are not limited to the embodiment of FIG. 2.

In addition, a functional block may be configured by a piece of hardware, a piece of software, or their combination.

In the case that the sequence is performed by software, a program configuring the software is installed in a computer or the like from a network or a storage medium.

The computer may be a computer which is incorporated in dedicated hardware. In addition, the computer may be a computer capable of executing various functions by installing various programs therein, for example, a general-purpose personal computer.

A storage medium for recording such a program consists of not only the removable media 31 shown in FIG. 1 which is distributed separately from the apparatus's main body to provide it to users, but also a storage medium or the like which is provided to users in a state of being incorporated in the apparatus's main body in advance. The removable media 31 includes, for example, a magnetic disk (including a floppy disk), an optical disc, a magneto-optical disk, or the like. For example, the optical disc includes a compact disk-read only memory (CD-ROM), a digital versatile disk (DVD), a Blu-ray (Registered Trademark) disc, or the like. The magneto-optical disk includes a Mini-Disk (MD), or the like. In addition, the storage medium which is provided to the users in a state of being incorporated in the apparatus's main body in advance includes, for example, the ROM 12 in FIG. 1 in which a program is recorded, a hard disk included in the storage unit 19 in FIG. 1, or the like.

Further, in the description presented here, the steps describing a program recorded in a recording medium include not only processes to be executed serially in time in order, but also processes which are not necessarily executed serially in time but in a parallel manner or individually.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. An imaging apparatus for interval shooting of taking shots sequentially at a set shooting interval, the apparatus comprising:
   a processor that is configured to:
      determine a shooting situation; and
      automatically limit a range which is manually settable by an operation of a user of a time-related shooting parameter including the shooting interval in setting of the interval shooting, according to the determined shooting situation.

2. The imaging apparatus of claim 1, wherein the processor is configured to automatically limit the range of the time-related shooting parameter to a range determined in consideration of a time required for necessary processing according to the determined shooting situation.

3. The imaging apparatus of claim 2, wherein the processor is further configured to specify a necessary processing and a time required for the necessary processing for each shot of the interval shooting according to the determined shooting situation, and
   wherein the processor is configured to automatically limit the range of the time-related shooting parameter to a range which can secure the time required for the specified necessary processing within one shooting interval of the interval shooting.

4. The imaging apparatus of claim 1, wherein the processor is configured to automatically limit ranges, which are manually settable by operations of the user, of a plurality of time-related shooting parameters, and
   wherein the processor is configured to automatically limit, according to a setting of one time-related shooting parameter from among the plurality of time-related shooting parameters, the ranges of one or more other time-related shooting parameters from among the plurality of time-related shooting parameters.

5. The imaging apparatus of claim 4, wherein the one time-related shooting parameter is the shooting interval.

6. The imaging apparatus of claim 5, wherein the one or more other time-related shooting parameters include shutter speed.

7. The imaging apparatus of claim 4, wherein the one time-related shooting parameter is shutter speed.

8. The imaging apparatus of claim 7, wherein the one or more other time-related shooting parameters include the shooting interval.

9. The imaging apparatus of claim 1, wherein the processor is configured to automatically limit the range to a range determined in consideration of a time required for dark subtraction processing which is necessary in a case in which the determined shooting situation is a situation where a brightness of a captured image is low.

10. The imaging apparatus of claim 1, wherein, in a case in which the determined shooting situation is a shooting mode selected by the user for performing predetermined image processing for a captured image, the processor is configured to automatically limit the range to a range determined in consideration of a time required for image processing which is necessary for the shooting mode selected by the user.

11. The imaging apparatus of claim 1, wherein the processor is further configured to set an initial value of the time-related shooting parameter to a different value within a settable range limited according to the determined shooting situation.

12. The imaging apparatus of claim 1, wherein the processor is configured to determine the shooting situation automatically or to determine the shooting situation to be a shooting mode set manually by a user.

13. The imaging apparatus of claim 1, wherein the processor is configured to automatically limit the range to a range that ensures that the interval shooting is possible according to the determined shooting situation.

14. An imaging apparatus for interval shooting of taking shots sequentially at a set shooting interval, the apparatus comprising:
   a processor that is configured to:
      determine a shooting situation; and
      automatically limit, in setting of the interval shooting and according to the determined shooting situation and a setting of one time-related shooting parameter including the shooting interval from among a plurality of time-related shooting parameters, settable ranges of one or more other time-related shooting parameters from among the plurality of time-related shooting parameters to ranges that ensure that the interval shooting is possible.

15. An imaging method executed by an imaging apparatus for performing interval shooting of taking shots sequentially at a set shooting interval, the method comprising:
   determining a shooting situation; and
   automatically limiting a range which is manually settable by an operation of a user of a time-related shooting parameter including the shooting interval in setting of the interval shooting, according to the determined shooting situation.

16. An imaging method executed by an imaging apparatus for performing interval shooting of taking shots sequentially at a set shooting interval, the method comprising:
determining a shooting situation; and
automatically limiting, in setting of the interval shooting and according to the determined shooting situation and a setting of one time-related shooting parameter including the shooting interval from among a plurality of time-related shooting parameters, settable ranges of one or more other time-related shooting parameters from among the plurality of time-related shooting parameters to ranges that ensure that the interval shooting is possible.

17. An imaging method executed by an imaging apparatus for performing interval shooting of taking shots sequentially at a set shooting interval, the method comprising:
determining a shooting situation; and
automatically limiting a settable range of a shutter speed to a range that ensures that the interval shooting is possible, according to the determined shooting situation and a setting of the shooting interval.

18. An imaging method executed by an imaging apparatus for performing interval shooting of taking shots sequentially at a set shooting interval, the method comprising:
determining a shooting situation; and
automatically limiting a settable range of the shooting interval to a range that ensures that the interval shooting is possible, according to the determined shooting situation and a setting of a shutter speed.

19. A non-transitory computer-readable recording medium having a program recorded thereon that is readable by a computer controlling an imaging apparatus for performing interval shooting of taking shots sequentially at a set shooting interval, the program controlling the computer to perform functions comprising:
a determining function for determining a shooting situation; and
a range setting function for automatically limiting a range, which is manually settable by an operation of a user, of a time-related shooting parameter including the shooting interval in setting of the interval shooting to a range that ensures that the interval shooting is possible, according to the shooting situation determined by the determining function.

20. A non-transitory computer-readable recording medium having a program recorded thereon that is readable by a computer controlling an imaging apparatus for performing interval shooting of taking shots sequentially at a set shooting interval, the program controlling the computer to perform functions comprising:
a determining function for determining a shooting situation; and
a range setting function for automatically limiting, according to the shooting situation determined by the determining function and a setting of one time-related shooting parameter including the shooting interval of the interval shooting from among a plurality of time-related shooting parameters, settable ranges of one or more other time-related shooting parameters from among the plurality of time-related shooting parameters.

* * * * *